United States Patent
Hövel et al.

(10) Patent No.: US 8,156,649 B2
(45) Date of Patent: Apr. 17, 2012

(54) GAS TURBINE HOT GAS COMPONENT REPAIR METHOD

(75) Inventors: Simone Hövel, Ennetbaden (CH); Alexander Stankowski, Siggenthal-Station (CH); Günter Ambrosy, Baden-Dättwil (CH); Matthias Hoebel, Windisch (CH); Alexander Schnell, Baden (CH); Hans Bissig, Wohlen (CH); Rainer Kurtz, Baden-Rütihof (CH)

(73) Assignee: Alstom Technology Ltd, Baden (CH)

( * ) Notice: Subject to any disclaimer, the term of this patent is extended or adjusted under 35 U.S.C. 154(b) by 401 days.

(21) Appl. No.: 12/420,578

(22) Filed: Apr. 8, 2009

(65) Prior Publication Data

US 2009/0255117 A1    Oct. 15, 2009

(30) Foreign Application Priority Data

Apr. 9, 2008   (EP) .................................... 08154234

(51) Int. Cl.
*B23P 6/00* (2006.01)
(52) U.S. Cl. .................. 29/889.1; 29/402.07; 29/402.09
(58) Field of Classification Search ................. 29/889.1, 29/402.07, 402.09
See application file for complete search history.

(56) References Cited

U.S. PATENT DOCUMENTS

| | | | |
|---|---|---|---|
| 6,199,746 B1 | 3/2001 | Dupree et al. | |
| 6,508,000 B2 | 1/2003 | Burke et al. | |
| 6,998,568 B2 | 2/2006 | Brehm et al. | |
| 7,051,435 B1 | 5/2006 | Subramanian et al. | |
| 2002/0153405 A1 | 10/2002 | Esch | |
| 2003/0165385 A1 | 9/2003 | Esch | |
| 2006/0277753 A1* | 12/2006 | Ntsama-Etoundi et al. | 29/889.1 |

FOREIGN PATENT DOCUMENTS

| | | |
|---|---|---|
| EP | 1 238 742 A1 | 9/2002 |
| EP | 1 867 423 A1 | 12/2007 |
| JP | 9-168927 A | 6/1997 |
| JP | 2001-207803 A | 8/2001 |

OTHER PUBLICATIONS

An introduction to Brazing, Sulzer Metco, Mar. 2009.*
European Search Report dated Oct. 7, 2008.

* cited by examiner

*Primary Examiner* — David Bryant
*Assistant Examiner* — Moshe Wilensky
(74) *Attorney, Agent, or Firm* — Buchanan Ingersoll & Rooney PC

(57) ABSTRACT

A gas turbine engine hot gas component repair method for defects that do not extend through the thickness of the component is provided. First defects are removed by machining a cavity in the surface of a component. Coupons, fittable within the cavities are manufactured, are for example coated with brazing medium on an inner surface and then joined to the component by joining means such as laser metal forming. The joint holds the coupon during later heat treatment, thereby eliminating a need for holding aids. Before heat treatment, a further brazing medium can be applied to the surface of the coupon overlapping onto the component. A single heat treatment, brazing the coupon to the component and, brazing the brazing medium to the outer surface of the coupon can, then be used to complete the repair.

23 Claims, 1 Drawing Sheet

GAS TURBINE HOT GAS COMPONENT REPAIR METHOD

RELATED APPLICATION

This application claims priority under 35 U.S.C. §119 to European Patent Application No. 08154234.2 filed in Europe on Apr. 9, 2008, the entire content of which is hereby incorporated by reference in its entirety.

TECHNICAL FIELD

The disclosure relates to a method of repairing hot gas components of a gas turbine engine.

BACKGROUND INFORMATION

In a gas turbine engine hot gas components such as the stator heat shield can become damaged or worn during service. Due to the cost of the components, repair can be preferred over replacement.

Repair methods include methods that involve completely removing a through section of a damaged portion of the component and replacing it with a replacement part. For example U.S. Pat. No. 6,508,000 describes a repair method where a 3D featured replacement part having curved surfaces with corners and edges is fitted by transient liquid phase bonding. The shape of the replacement part is used to align and hold the part during bonding. The method therefore may not be suitable where the repair surface is essentially two-dimensional.

U.S. Pat. No. 6,199,746 provides another repair method where a through section of a component defect is removed by creating an aperture with sloping sides. The slope essentially creates a 3D feature enabling the fitting of a similarly side-sloped plug by forcing the plug into the aperture and subsequently bonding it to the component. While this method enables repair of some essentially two-dimensional defective portions, the forcing of the plug into the aperture potentially creates stress regions and/or defects, affecting component integrity.

Removing a through section of a defective portion, as provided in U.S. Pat. No. 6,508,000 and U.S. Pat. No. 6,199,746, means that the replacement part should be able to withstand the full operating stress the component is subject to, and therefore material and bond integrity can be critical. Where the defect does not penetrate through the depth of the component, such that there is no need to remove a through section of the component, it can be desirable to have an alternative repair method.

Laser metal forming can be used to repair damaged portions having two-dimensional shape by building up a metal layer to replace or remove the damaged regions. The method may not suitable where significant metal depth is involved as the process can be expensive and time consuming.

As an alternative, U.S. Pat. No. 6,998,568 describes a two step method that includes brazing a replacement coupon into a cavity made within the damaged component and then completing the repair using laser metal forming to build up coupon depth so as to reestablish wall thickness requirements. Although disadvantaged by being a two-step process, the demands of a high tolerance replacement part can be reduced, and the disadvantage of the laser metal forming process can be reduced although significant time-consuming laser metal forming can still be involved. In addition the coupon should be fixed mechanically, such as by clamping during the brazing step, a difficult task for some complex shaped components, or by tack welded shims that are subsequently removed. This can result in several different repair cycles if more than one defect needs to be repaired, or the method may not be practical for the component involved.

SUMMARY

A method of repairing hot gas components of a gas turbine engine is disclosed which can address fixing a replacement coupon during repair and providing an alternative method to rebuilding of the component thickness.

A gas turbine engine hot gas component repair method is disclosed for defects that do not extend through a thickness of the component, comprising:

a) machining at least one cavity in a surface of the component to remove at least one defect from the component;

b) manufacturing at least one coupon fittable within the cavity;

c) applying a brazing medium to the coupon to enable brazing of the coupon to the component;

d) fitting the coupon as a fitted coupon into the cavity;

e) joining the fitted coupon to the component at an outer edge of the fitted coupon;

f) applying foil or sheet brazing medium to the fitted coupon to achieve a thickness requirement of the component; and g) subjecting the component to a thermal cycle wherein the foil or sheet brazing medium is brazed to an outer surface of the coupon.

A gas turbine engine hot gas component repair method is also disclosed for defects that do not extend through a thickness of the component, comprising:

a) machining at least one cavity in a surface of the component to remove at least one defect from the component;

b) manufacturing at least one coupon fittable within the cavity;

c) applying a brazing medium to the coupon to enable brazing of the coupon to the component;

d) fitting the coupon as a fitted coupon into the cavity;

e) joining the fitted coupon to the component at an outer edge of the fitted coupon;

f) applying foil or sheet brazing medium to the fitted coupon to achieve a thickness requirement of the component; and g) subjecting the component to a single thermal cycle wherein the foil or sheet brazing medium is brazed to an outer surface of the coupon and the coupon is brazed to the component.

BRIEF DESCRIPTION OF THE DRAWINGS

Other objectives and advantages of the present disclosure will become apparent from the following description, taken in connection with the accompanying drawings wherein by way of illustration and example, an embodiment of the disclosure is disclosed.

Exemplary embodiments of the present disclosure will be described with reference to the drawings, wherein like reference numerals are used to refer to like elements throughout.

Figure 1:
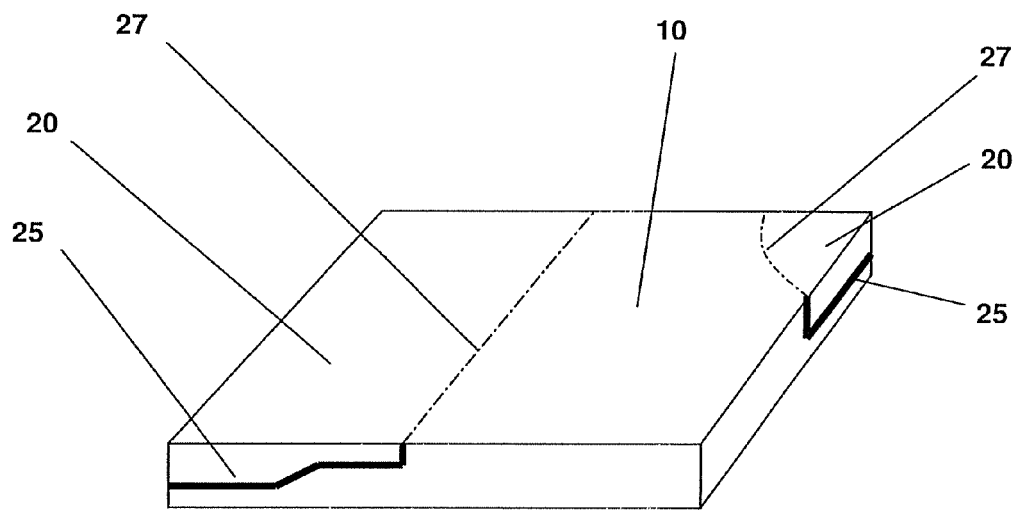
Figure 2:
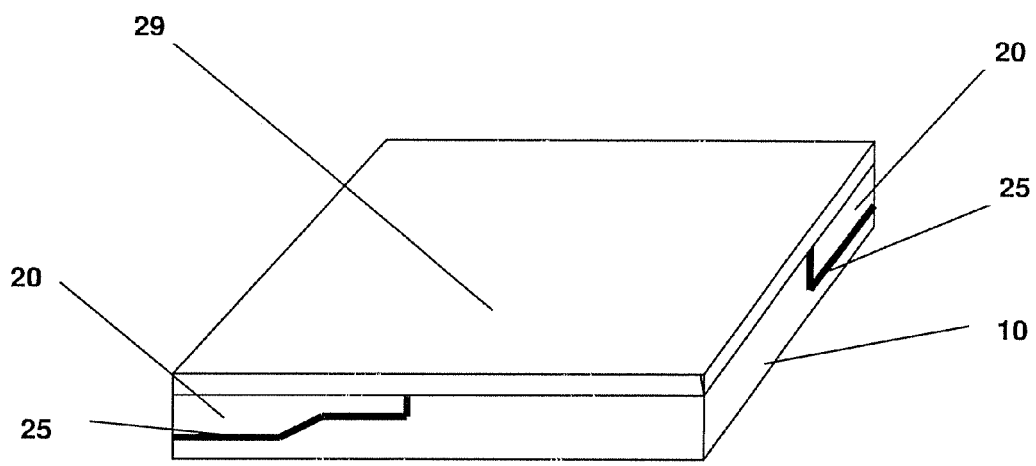

By way of example, an embodiment of the disclosure is described more fully hereinafter with reference to the accompanying drawings, in which:

FIG. 1 is a perspective view of an exemplary component portion with fitted coupons of the disclosure; and FIG. 2 is a perspective view of FIG. 1 with an exemplary layer of brazing material covering coupons and a neighboring surface of the component.

DETAILED DESCRIPTION

A gas turbine engine component repair method is disclosed for defects that do not extend through the thickness of the component.

Exemplary methods as disclosed herein are suitable for repairing component portions where mechanical fixing of repair coupons to damaged portions of the component during thermal treatment is difficult or not desired, to thereby enable repair of a wider range of components. Exemplary embodiments can provide a useful alternate method for building up the metal thickness of a repair coupon that can be simpler, easier and quicker than laser metal forming or other known metal build-up processes.

In exemplary alternate embodiments, a component can be subjected to a single thermal cycle wherein a foil or sheet brazing medium is brazed to an outer surface of the coupon and the coupon can be brazed to a base metal of the component, thereby enabling further optimization of the repair cycle and reducing repair time and cost.

In one exemplary aspect of the disclosure, applying foil or sheet brazing medium to the fitted coupon to achieve a thickness requirement of the component includes applying foil or sheet brazing medium to at least a portion of the component for building up component metal thickness as well as that of the repaired portion.

Another exemplary aspect includes, before applying a brazing medium to the coupon to enable brazing of the coupon to the component, a step of machining a surface of the coupon to reduce the manufacturing tolerance requirements of the coupon.

In yet another aspect, an exemplary method provides that a joining step for joining a fitted coupon to the component at an outer edge of the fitted coupon is either by laser metal forming, electron beam welding or TIG (Tungsten Inert Gas) welding, and a resulting joint is heat treated as part of the subjecting of the component to a thermal cycle wherein a foil or sheet brazing medium is brazed to an outer surface of the coupon. In an exemplary aspect, the joint is made along discrete points of the edge, reducing the time to make the joint and any rework desired to contour it afterwards, although the joint can be made so as to not affect the contour between the component and the coupon. In an exemplary aspect, this can be done by laser metal forming along the outer edge of the coupon.

In yet another aspect, an exemplary method includes a step of re-contouring after subjecting the component to a thermal cycle wherein the foil or sheet brazing medium is brazed to an outer surface of the coupon.

The method can be used to repair any gas turbine engine hot gas component, including those made from single crystal, directional solidified or known cast material.

Exemplary embodiments can overcome or at least ameliorate disadvantages and shortcomings of known methods and/or provide a useful alternative.

In the following description, for purposes of explanation, numerous specific details are set forth in order to provide a thorough understanding of the disclosure. It may be evident, however, that the disclosure may be practiced without these specific details. Well-known structures and devices are shown in block diagram form in order to facilitate description of the disclosure.

As shown in FIG. 1 and FIG. 2, an exemplary embodiment provides a repair method for repairing a defect on a component without penetrating through the component, and is suitable for repairing defects including cracks, cavities and surface irregularities. An exemplary method includes fitting coupons 20 inside cavities created in the surface of the component 10 and fixing them to the component by laser metal forming/welding or other known means. Vacuum brazing can then be used to bond the coupon 20 to the component 10 and restore wall thickness and shape without the need for mechanical fixing of the coupon 10 during the vacuum brazing cycle, and as a result more than one defect can be repaired during the single cycle using multiple coupons.

In detail, an exemplary method includes machining of one or more damaged portions of a component to remove defects thereby forming cavities on a surface of the component 10. Coupons 20 are then manufactured to fit inside each of the cavities, for example, with allowance for thickness of a brazing material so as to optimize gap control. Further, for example, at least part of the surface of coupons 20 can be shaped by machining so as to yet further relax manufacturing tolerances.

Brazing medium 25 of any known suitable form, for example, pre-sintered form, or other binder free form, can be applied to each coupon (i.e., coated onto the coupon or applied within the cavity) so that when coupons are fitted into the cavities, the brazing medium 25 forms a barrier layer between coupons 20 and walls of the cavity, thereby enabling the interface to be bonded during a subsequent vacuum brazing cycle or, in an alternative embodiment, in a later heat treatment step.

Coupons 20 are then inserted into the cavities. In one embodiment the component 10 undergoes a thermal cycle to braze the coupon 20 to the component 10 before joining (i.e., fixing) the coupon to the component 10. Fixing can then be by laser metal forming, laser metal joining, electron beam welding, TIG or other joining methods, for example along discrete points or alternatively continuously along the coupon edge/component interface. The joint can be formed so as to be near final shape, for example by laser metal forming, so as to eliminate further reshaping and/or so as to further relax the manufacturing tolerance of the coupon 20.

In another embodiment, coupons 20 are joined (i.e., fixed) without a prior brazing cycle. The weld/joint 27 of the fixing method provides a hold on the coupon 20 that is used to fix coupons 20 during subsequent heat treatment, thereby eliminating the need for additional mechanical holding aids, such as clamping or tack welding of shims that subsequently are removed. In this way the applicability of the method can be extended to the repair of component 10 portions not suitable for clamping, and/or provides a useful alternative to known fixing methods.

Where laser metal joining is used as the fixing means, it can be done by fiber coupling where the output end of the fiber is connected to either a robot or CNC work cell while, for example, a galvano scanner performs beam manipulation. The laser can be a fiber or disk laser with a beam parameter product of less than 10 mm*mrad and can use the principle of adaptive machining, where a 3D vision system is integrated into the process and the results from the 3D geometry scanning are used to individually adapt a pre-programmed welding strategy to each part. In an exemplary embodiment, an online temperature measurement system can provide input to an active feedback controller in order to maintain optimum operating weld conditions during metal joining.

Before a damaged base material undergoes a vacuum brazing cycle, the fitted coupons 20, and for example neighboring surfaces of the component 10, can be covered with, for example, a continuous layer of sheet of foil brazing medium 29. This can provide a means of adding metal to the component 10.

A vacuum brazing cycle can then braze the sheet or foil brazing medium 29 to the outer surface of the coupon 20 and in the same single thermal cycle, can heat treat the coupon/component joint 27. In an exemplary embodiment, with this single heat treatment cycle, the cycle can bond each fitted coupon 20, to braze the coupon to a base metal of the component.

As a finishing step, the repaired surface can, for example, be re-contoured so that the repaired article's final dimensions are reestablished, although the need for the re-contouring step can be component dependent.

Although the disclosure has been herein shown and described in what are considered to be the most practical and preferred embodiments, it is recognized that departures can be made within the scope of the disclosure, which is not to be limited to details described herein but is to be accorded the full scope of the appended claims so as to embrace any and all equivalent devices and apparatus.

It will therefore be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE NUMBERS

10 Component
20 Coupon
25 Binder free brazing material between cavity wall and coupon
27 Spot-welded joint between edge of coupon and component
29 Brazing medium in the form of foil or a sheet

What is claimed is:

1. A gas turbine engine hot gas component repair method for defects that do not extend through a thickness of the component, comprising:
    a) machining at least one cavity in a surface of the component to remove at least one defect from the component;
    b) manufacturing at least one coupon fittable within the cavity;
    c) applying a brazing medium to the coupon to enable brazing of the coupon to the component;
    d) fitting the coupon as a fitted coupon into the cavity;
    e) joining the fitted coupon to the component at an outer edge of the fitted coupon;
    f) applying foil or sheet brazing medium to the joined coupon to cover the joined coupon and form an outer surface of the component to provide a thickness of the component; and
    g) subjecting the component to a thermal cycle wherein the foil or sheet brazing medium is brazed to an outer surface of the coupon.

2. The method of claim 1, wherein the brazing medium is a binder free brazing medium.

3. The method of claim 1, wherein step f) includes applying the foil or sheet brazing medium to surfaces of the component neighboring the fitted coupon.

4. The method of claim 1, wherein before step c), the method comprises:
    machining a surface of the coupon.

5. The method of claim 1, wherein the joining of step e) comprises:
    laser metal forming or electron beam welding, and a resulting joint is heat treated as part of step g).

6. The method of claim 1, wherein the joining of step e) comprises:
    TIG welding, and a resulting joint is heat treated as part of step g).

7. The method of claim 1, wherein the joining is along discrete points along an outer edge of the coupon.

8. The method of claim 1, wherein joining comprises:
    laser metal forming along an outer edge of the coupon to create a near final shape joint.

9. The method of claim 1, comprising:
    re-contouring after step g).

10. The method of claim 1, wherein the component is made from single crystal or directionally solidified material.

11. The method of claim 1, wherein the component is made from cast material.

12. A gas turbine engine hot gas component repair method for defects that do not extend through a thickness of the component, comprising:
    a) machining at least one cavity in a surface of the component to remove at least one defect from the component;
    b) manufacturing at least one coupon fittable within the cavity;
    c) applying a brazing medium to the coupon to enable brazing of the coupon to the component;
    d) fitting the coupon as a fitted coupon into the cavity;
    e) joining the fitted coupon to the component at an outer edge of the fitted coupon;
    f) applying foil or sheet brazing medium to the joined coupon to cover the joined coupon and form an outer surface of the component to provide a thickness of the component; and
    g) subjecting the component to a single thermal cycle wherein the foil or sheet brazing medium is brazed to an outer surface of the coupon and the coupon is brazed to the component.

13. The method of claim 12, wherein the brazing medium is a binder free brazing medium.

14. The method of claim 12, wherein step f) includes applying the foil or sheet brazing medium to neighboring surfaces of the fitted coupon.

15. The method of claim 12, wherein before step c), the method comprises:
    machining a surface of the coupon.

16. The method of claim 12, wherein the joining step of step e) comprises:
    laser metal forming or electron beam welding, and a resulting joint is heat treated as part of step g).

17. The method of claim 12 wherein the joining step of step e) comprises:
    TIG welding, and the resulting joint is heat treated as part of step g).

18. The method of claim 12, wherein the joining is along discrete points along an outer edge of the coupon.

19. The method of claim 12, wherein joining comprises:
    laser metal forming along an outer edge of the coupon to create a near final shape joint.

20. The method of claim 12, comprising:
    re-contouring after step g).

21. The method of claim 12, wherein the component is made from single crystal or directionally solidified material.

22. The method of claim 12, wherein the component is made from cast material.

23. The method of claim 1, comprising:
    before step e), subjecting the component to an initial thermal cycle wherein the coupon is brazed to the component.

* * * * *